(12) United States Patent
Shu

(10) Patent No.: US 7,282,234 B2
(45) Date of Patent: *Oct. 16, 2007

(54) METHOD FOR PRODUCING A JERKED MEAT RAWHIDE CHEW TOY

(76) Inventor: Chia-Lung Shu, 13F, No. 585, Chungkang Rd., Hsinchuang City, Taipei Hsien (TW)

( * ) Notice: Subject to any disclaimer, the term of this patent is extended or adjusted under 35 U.S.C. 154(b) by 588 days.

This patent is subject to a terminal disclaimer.

(21) Appl. No.: 10/857,186

(22) Filed: May 28, 2004

(65) Prior Publication Data

US 2005/0266146 A1  Dec. 1, 2005

(51) Int. Cl.
*A23K 1/00* (2006.01)
*A23K 1/10* (2006.01)
*A23K 3/00* (2006.01)

(52) U.S. Cl. .................. 426/641; 426/89; 426/92; 426/302; 426/305; 426/518; 426/805

(58) Field of Classification Search ............ 426/89, 426/92, 302, 305, 518, 641, 805, 32, 516
See application file for complete search history.

(56) References Cited

U.S. PATENT DOCUMENTS 3,808,340 A * 4/1974 Palmer ................. 426/92
5,011,679 A * 4/1991 Spanier et al. ............ 424/57
5,897,893 A * 4/1999 Mohilef ................ 426/89

\* cited by examiner

*Primary Examiner*—Keith Hendricks
*Assistant Examiner*—Vera Stulii
(74) *Attorney, Agent, or Firm*—Alan Kamrath; Kamrath & Associates PA

(57) ABSTRACT

A method for producing a jerked meat rawhide chew toys has acts of providing rawhide chew toys, preparing meat, processing the meat, coating the rawhide chew toys with meat and drying the rawhide chew toys coated with meat. According to the method, the rawhide chew toys are coated with meat and jerked to improve dogs' desire to chew rawhide chew toys a long time to achieve the objective of cleaning dogs' teeth better.

10 Claims, 4 Drawing Sheets

METHOD FOR PRODUCING A JERKED MEAT RAWHIDE CHEW TOY

BACKGROUND OF THE INVENTION

1. Field of the Invention

The present invention relates to a method for producing a rawhide chew toy, and more particularly to a method for producing a jerked meat rawhide chew toy to improve the taste.

2. Description of Related Art

One of the most popular pets in modern society is the ever-faithful dog. Pet owners who pay particular attention to their pets' food are concerned with a balanced diet that includes the judicious use of dog-snacks.

Conventional dog-snacks are used to make teeth stronger and whiter. Rawhide chew toys are a favorite dog-snack. With reference to FIG. 4, a conventional rawhide chew toy (60) is made by breaking rawhide into pieces and extruding the rawhide pieces in a bone shape to encourage a dog to chew the chew toy. However, the conventional rawhide chew toy (60) only exercises a dog's jaw and cleans its teeth and gums. Since the conventional rawhide chew toy (60) does not have meat, dogs quickly lose interest in chewing the rawhide chew toy (60) even when flavoring has been added to the rawhide.

SUMMARY OF THE INVENTION

The main objective of the present invention is to provide a method for producing a jerked meat rawhide chew toy to improve the taste.

To achieve the objective, a method for producing a jerked meat rawhide chew toy in accordance with the present invention comprises the acts of providing a rawhide chew toy, preparing meat, processing the meat, coating the rawhide chew toy with meat and drying the rawhide chew toy coated with meat. The jerked meat on the rawhide chew toy causes a dog to chew the rawhide chew toy a longer time to improve a dog's oral hygiene.

Further benefits and advantages of the present invention will become apparent after a careful reading of the detailed description with appropriate reference to the accompanying drawings.

DETAILED DESCRIPTION OF THE INVENTION

Figure 1:
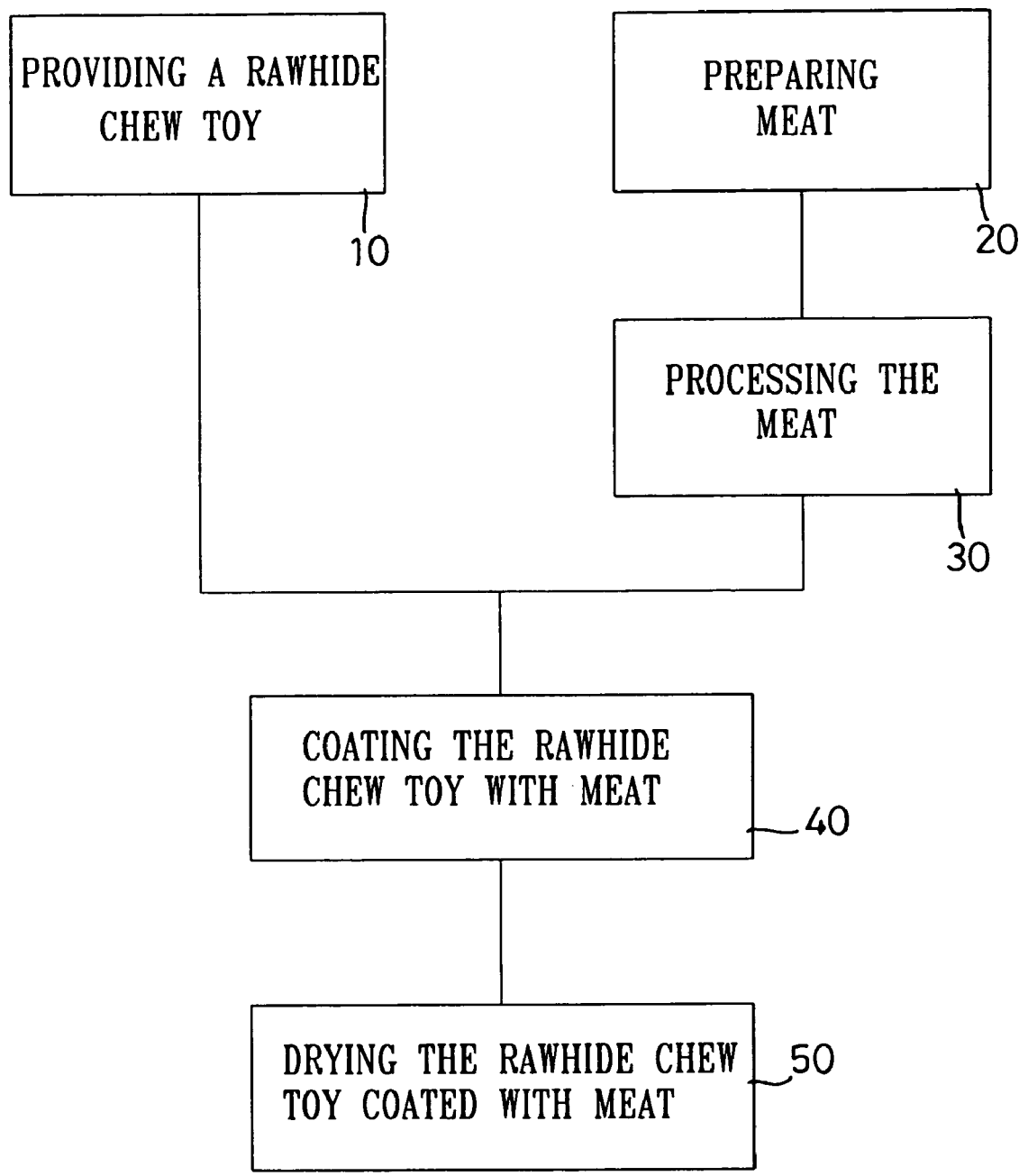
FIG. 1 is a flow chart of a method of producing a jerked meat rawhide chew toy in accordance with the present invention.

With reference to FIG. 1, a method for producing a jerked meat rawhide chew toy in accordance with the present invention comprises the steps of providing a rawhide chew toy (10), preparing meat (20), processing the meat (30), coating the rawhide chew toy with meat (40) and drying the rawhide chew toy coated with meat (50).

The step of providing a rawhide chew toy (10) comprises providing a rawhide chew toy that is produced by a conventional method or is sold in the market. The provided rawhide chew toy is produced by 1) twisting rawhide and knotting into a bone shape or 2) breaking rawhide into pieces, extruding into a bone or other shapes.

The step of preparing meat (20) is directed to keeping the meat fresh and comprises grinding the meat of domestic fowl or livestock, for example chicken breast meat and tenderloin, in a meat grinder and mixing the ground meat with a treatment solution. The treatment solution comprises sorbitol, vitamin C, polyphosphate and sodium nitrite. The treatment solution comprises 3 wt % sorbitol, 0.1 wt % vitamin C, 0.1 wt % polyphosphate and 0.1 wt % sodium nitrite. The sorbitol provides an anti-oxidant characteristic to the meat and tenderizes the meat. The vitamin C also provides an anti-oxidant characteristic to the meat. The sodium nitrite makes the meat red and prevents *Clostridium botulinus* from growing. The polyphosphate increases water retention to improve the rate of producing products and makes the surface of the products tighten and dry.

The step of processing the meat (30) is directed to increasing the flavor of the meat and comprises adding spices such as ham essence, bacon essence, smoked meat essence or other spices to the ground meat.

The step of coating the rawhide chew toy with meat (40) comprises either directly spreading the processed meat onto the surface of the rawhide chew toy or using a mold to extrude the processed meat onto the surface of the rawhide chew toy.

The step of drying the rawhide chew toy coated with meat (50) is divided into two phases. The first phase dries the rawhide chew toy coated with meat in an oven at 80° C. for 3 hours. The second phase completely dries the rawhide chew toy coated with meat in the oven at 55° C. for about 20 to 40 hours and finishes the jerked meat chew toy.

Figure 2:
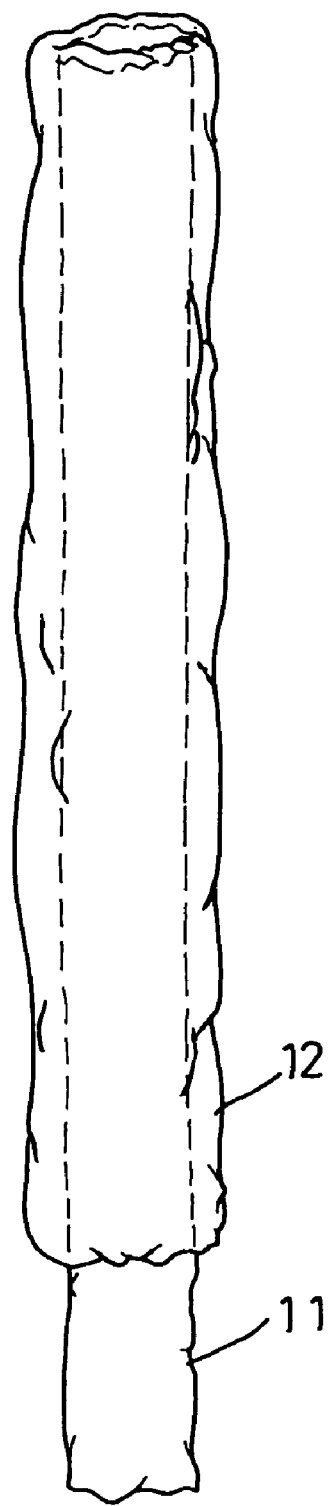
FIG. 2 is a perspective view of a first embodiment of a jerked meat rawhide chew toy produced by the method depicted in FIG. 1.

With reference to FIG. 2, a rawhide chew toy (11) can be used to produce the coated rawhide chew toy by coating the surface of the rawhide chew toy (11) with processed jerked meat (12) and drying the combination.

Figure 3:
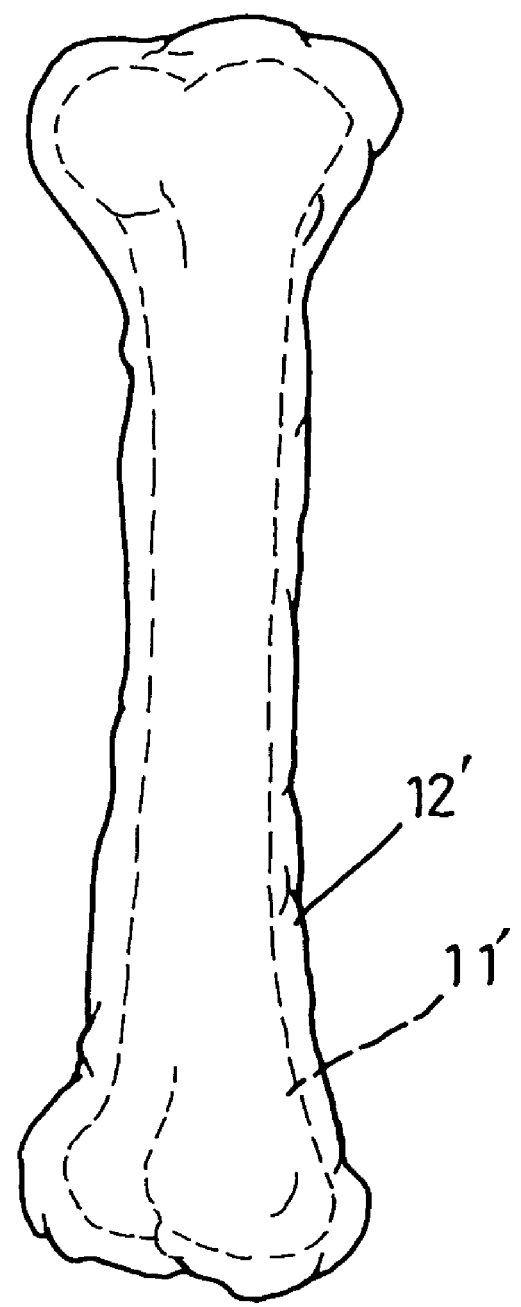
FIG. 3 is a perspective view of a second embodiment of a jerked meat rawhide chew toy produced by the method depicted in FIG. 1.
Figure 4:
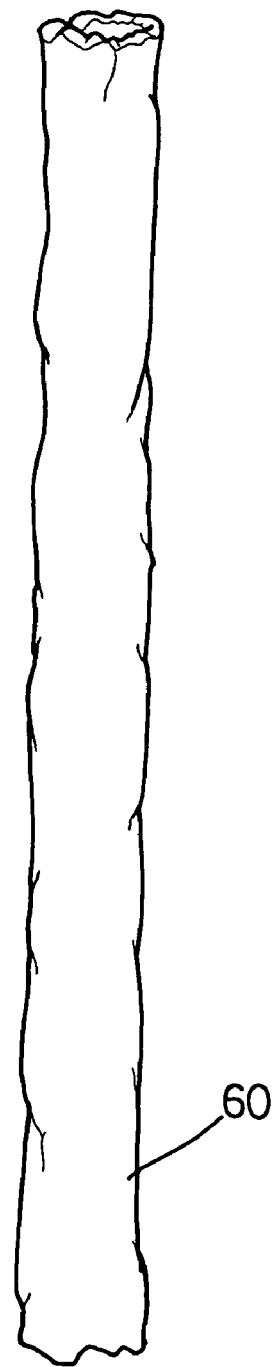
FIG. 4 is a perspective view of conventional rawhide chew toy in accordance with the prior art.

With further reference to FIG. 3, a rawhide chew toy (11') can be made in different shapes, and the surface of the rawhide chew toy (11') is covered with jerked meat (12'). According to the method in accordance with the present invention, the jerked meat (12, 12') on the rawhide chew toy (11, 11') will increase a dog's desire to chew the rawhide chew toy so as to improve the dog's oral hygiene.

Although the invention has been explained in relation to its preferred embodiment, many other possible modifications and variations can be made without departing from the spirit and scope of the invention as hereinafter claimed.

What is claimed is:

1. A method for producing jerked meat rawhide chew toys comprising:
   providing rawhide chew toys;
   preparing meat to keep the meat fresh comprising grinding meat in a meat grinder and mixing the ground meat with a treatment solution that comprises sorbitol, vitamin C, polyphosphate and sodium nitrite;
   processing the meat to increase the meat flavor;
   coating the rawhide chew toys with the meat: and
   drying the rawhide chew toy coated with the meat.

2. The method for producing jerked meat rawhide chew toys as claimed in claim 1, wherein the treatment solution comprises 3 wt % sorbitol, 0.1 wt % vitamin C, 0.1 wt % polyphosphate and 0.1 wt % sodium nitrite.

3. The method for producing jerked meat rawhide chew toys as claimed in claim 2, wherein processing the meat comprises adding spices.

4. The method for producing jerked meat rawhide chew toys as claimed in claim 3, wherein coating the rawhide chew toys with meat comprises directly spreading the processed meat on the surface of the rawhide chew toys.

5. The method for producing jerked meat rawhide chew toys as claimed in claim 3, wherein coating the rawhide chew toys with meat comprises extruding the processed meat through a mold onto the rawhide chew toys.

6. The method for producing jerked meat rawhide chew toys as claimed in claim 4, wherein drying the rawhide chew toys coated with meat is divided into two phases, wherein
    the first phase comprises, drying the rawhide chew toys coated with meat in an oven at 80° C. for 3 hours; and
    the second phase comprises further drying the rawhide chew toys coated with meat in an oven at 55° C. for about 20 to 40 hours.

7. The method for producing jerked meat rawhide chew toys as claimed in claim 5, wherein drying the rawhide chew toys coated with meat is divided into two phases, wherein
    the first phase comprises drying the rawhide chew toys coated with meat in an oven at 80° C. for 3 hours; and
    the second phase comprises further drying the rawhide chew toys coated with meat in an oven at 55° C. for about 20 to 40 hours.

8. The method for producing jerked meat rawhide chew toys as claimed in claim 1, wherein coating the rawhide chew toys with meat comprises directly spreading the processed meat on the surface of the rawhide chew toys.

9. The method for producing jerked meat rawhide chew toys as claimed in claim 1, wherein coating the rawhide chew toys with meat comprises extruding the processed meat through a mold onto the rawhide chew toys.

10. The method for producing jerked meat rawhide chew toys as claimed in claim 1, wherein drying the rawhide chew toys coated with meat is divided into two phases, wherein
    the first phase comprises drying the rawhide chew toys coated with meat in an oven at 80° C. for 3 hours; and
    the second phase comprises further drying the rawhide chew toys coated with meat in an oven at 55° C. for about 20 to 40 hours.

* * * * *

(12) EX PARTE REEXAMINATION CERTIFICATE (7866th)
United States Patent
Shu

(10) Number: US 7,282,234 C1
(45) Certificate Issued: *Nov. 9, 2010

(54) METHOD FOR PRODUCING A JERKED MEAT RAWHIDE CHEW TOY

(75) Inventor: Chia-Lung Shu, Hsinchuang (TW)

(73) Assignee: Petlife International Co., Ltd., San-Chung, Taipei County (TW)

Reexamination Request:
No. 90/010,390, Jan. 21, 2009

Reexamination Certificate for:
Patent No.: 7,282,234
Issued: Oct. 16, 2007
Appl. No.: 10/857,186
Filed: May 28, 2004

(*) Notice: This patent is subject to a terminal disclaimer.

(51) Int. Cl.
*A23K 1/00* (2006.01)
*A23K 3/00* (2006.01)
*A23K 1/10* (2006.01)

(52) U.S. Cl. .................. 426/641; 426/302; 426/305; 426/518; 426/805; 426/89; 426/92

(58) Field of Classification Search .................. None
See application file for complete search history.

(56) References Cited

U.S. PATENT DOCUMENTS

| | | | |
|---|---|---|---|
| 3,808,340 A | 4/1974 | Palmer | |
| 4,910,038 A | 3/1990 | Ducharme | |
| 5,011,679 A | 4/1991 | Spanier et al. | |
| 5,047,231 A | 9/1991 | Spanier et al. | |
| 5,673,653 A | 10/1997 | Sherrill | |
| 5,897,893 A | 4/1999 | Mohilef | |
| 6,444,243 B1 | 9/2002 | Duensing et al. | |
| 6,799,536 B1 | 10/2004 | Jia et al. | |
| 6,840,196 B2 | 1/2005 | Kirch | |
| 6,886,496 B1 | 5/2005 | Brown | |
| 7,107,938 B2 | 9/2006 | Brown | |
| 2003/0215547 A1 | 11/2003 | Leyh, Jr. | |
| 2003/0228400 A1 | 12/2003 | Dahl et al. | |
| 2005/0037108 A1 | 2/2005 | Lin et al. | |
| 2005/0139167 A1 | 6/2005 | Leo | |

OTHER PUBLICATIONS

U.S. Appl. No. 60/435,638, Van H. Brown.
"Animal Digest," [online] [Retrieved on Oct. 15, 2008] Retrieved from Wikipedia, the free encyclopedia website, <URL:http://en.wikipedia.org/wiki/Animal_digest>.
"AAFCO Definitions of Dog Food Ingredients,"[online] [Retrieved on Oct. 15, 2008] Retrieved from braypets.com website, <URL:http://www.braypets.com/FRR/aafcodef.htm>.

*Primary Examiner*—Krisanne Jastrzab

(57) ABSTRACT

A method for producing a jerked meat rawhide chew toys has acts of providing rawhide chew toys, preparing meat, processing the meat, coating the rawhide chew toys with meat and drying the rawhide chew toys coated with meat. According to the method, the rawhide chew toys are coated with meat and jerked to improve dogs' desire to chew rawhide chew toys a long time to achieve the objective of cleaning dogs' teeth better.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 6-7 and 10 are cancelled.

Claims 1, 4-5 and 8-9 are determined to be patentable as amended.

Claims 2 and 3, dependent on an amended claim, are determined to be patentable.

1. A method for producing jerked meat rawhide chew toys comprising:
   providing rawhide chew toys;
   preparing meat to keep the meat fresh comprising grinding meat in a meat grinder and mixing the ground meat with a treatment solution that comprises sorbitol, vitamin C, polyphosphate and sodium nitrite;
   processing the meat to increase the meat flavor;
   coating the rawhide chew toys with the meat[:] *;* and
   drying the rawhide chew [toy] *toys* coated with the meat, *wherein drying the rawhide chew toys coated with the meat is divided into two phases, wherein the first phase comprises drying the rawhide chew toys coated with the meat in an oven at 80° C. for 3 hours; and*
   *the second phase comprises further drying the rawhide chew toys coated with the meat in an oven at 55° C. for about 20 to 40 hours.*

4. The method for producing jerked meat rawhide chew toys as claimed in claim 3, wherein coating the rawhide chew toys with *the* meat comprises directly spreading the processed meat on the surface of the rawhide chew toys.

5. The method for producing jerked meat rawhide chew toys as claimed in claim 3, wherein coating the rawhide chew toys with *the* meat comprises extruding the processed meat through a mold onto the rawhide chew toys.

8. The method for producing jerked meat rawhide chew toys as claimed in claim 1, wherein coating the rawhide chew toys with *the* meat comprises directly spreading the processed meat on the surface of the rawhide chew toys.

9. The method for producing jerked meat rawhide chew toys as claimed in claim 1, wherein coating the rawhide chew toys with *the* meat comprises extruding the processed meat through a mold onto the rawhide chew toys.

* * * * *